DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 794

T909,016
PRODUCTION OF LIQUID AMMONIUM POLYPHOSPHATE

Horace C. Mann, Jr., 1942 Holiday Drive, Florence, Ala. 35630

Filed Mar. 24, 1972, Ser. No. 237,627
Int. Cl. C05b 7/00
U.S. Cl. 71—34
1 Sheet Drawing. 24 Pages Specification

A process for the direct production of liquid fertilizer base solutions free of noncarbonaceous precipitates and

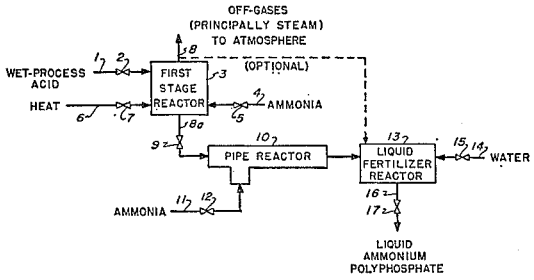

PRODUCTION OF LIQUID AMMONIUM POLYPHOSPHATE FROM ORTHOPHOSPHORIC ACID that usually contains upwards of 80 percent polyphosphate but can contain in excess of 80 percent polyphosphate from wet-process orthophosphoric acid, ammonia, and water. The process involves partial neutralization of the feed wet-process acid and formation of some of the polyphosphate in the first reactor followed by further ammoniation of the partially neutralized acid in a second reactor which may be of the common pipe type and where the remainder of the polyphosphate is formed; the resultant melt from the pipe reactor is then processed directly into a liquid fertilizer. Sufficient heat, in addition to that derived from the heat of ammoniation, is added to the first reactor to form sufficient polyphosphate so that on further ammoniation, melts of high polyphosphate content are formed. The resultant liquid fertilizers contain sufficient polyphosphate to sequester the magnesium and other impurities that normally precipitate from liquid fertilizers made with wet-process orthophosphoric acids. The advantage of this process is that liquids higher in polyphosphate content than those usually made directly from wet-process superphosphoric acid and as high in polyphosphate content as those made by the TVA direct process from the wet-process superphosphoric acid can now be made with wet-process orthophosphoric acid without a separate concentration step.

PRODUCTION OF LIQUID AMMONIUM POLYPHOSPHATE
Filed March 24, 1972
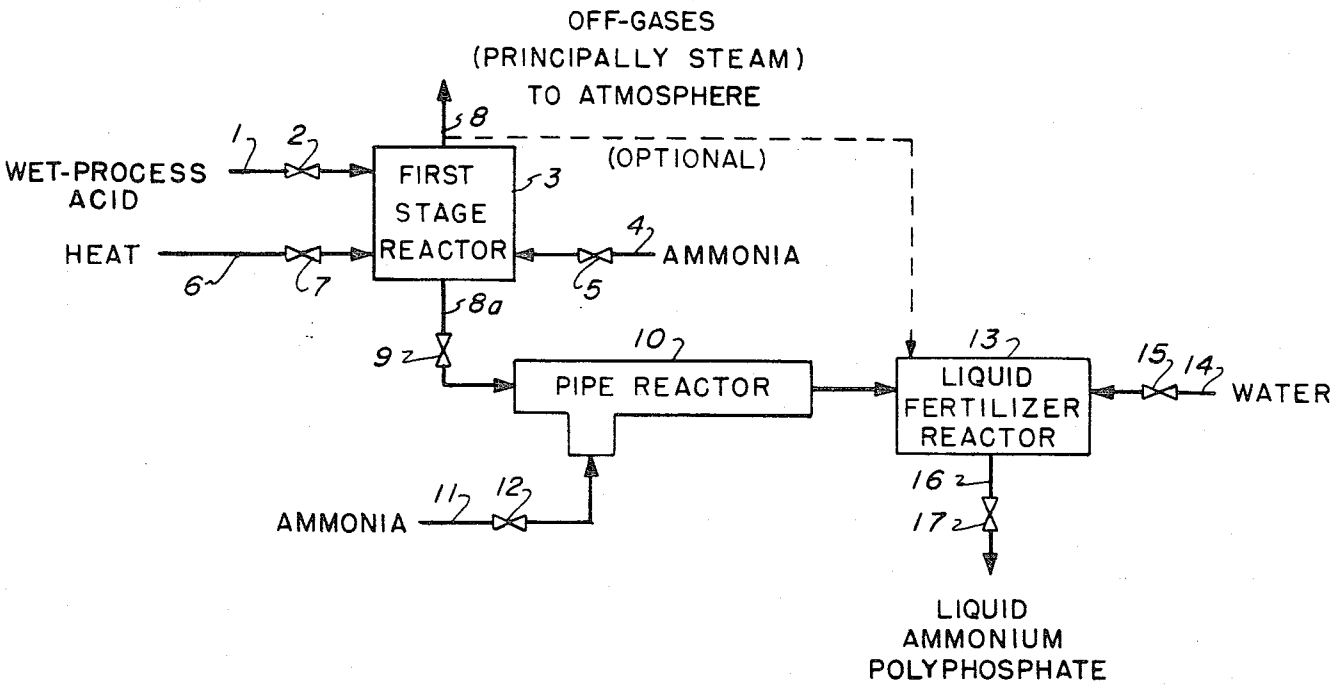
PRODUCTION OF LIQUID AMMONIUM POLYPHOSPHATE FROM ORTHOPHOSPHORIC ACID